Patented Feb. 8, 1927.

1,617,313

UNITED STATES PATENT OFFICE.

HARRY D. GIBBS, OF PENNS GROVE, NEW JERSEY, AND EDWIN L. FREDERICK, OF CATONSVILLE, MARYLAND, ASSIGNORS TO E. I. DU PONT DE NEMOURS & COMPANY, OF WILMINGTON, DELAWARE, A CORPORATION OF DELAWARE.

PROCESS OF MAKING ARYL-PERI ACIDS.

No Drawing. Application filed October 11, 1920, Serial No. 416,265. Renewed June 24, 1926.

This invention relates to a process of producing a 1-arylamino-naphthalene-8-sulphonic acid (that is, an aryl-peri acid) from 1-amino-naphthalene-8-sulphonic acid (peri acid), a primary arylamine, and water.

In the manufacture of phenyl-peri acid according to the prior art, (1) a mixture of aniline oil and aniline hydrochloride is heated at about 120° C. for about eight hours to insure the removal of water, the peri acid is added, the temperature raised to about 150° C. and maintained at that point for about 24 hours, and the resulting phenyl-peri acid purified; or, (2) a mixture of aniline oil and pure peri acid is heated under as high a vacuum as possible to remove all moisture, the heating being continued until about 6% of the aniline oil has distilled over; the vacuum is then broken and the mass heated for about 24 hours at 150° C., after which the excess aniline is removed and the remaining phenyl-peri acid purified; or, (3) the aniline and peri acid in suitable proportions are dissolved in a solution of hydrochloric acid, the solution heated in an autoclave at a temperature of about 140° C. for about 20 hours, the excess of aniline removed and the phenyl-peri acid purified.

We have discovered a way of condensing aniline, or other primary arylamine, with peri acid whereby the aryl-peri acids are obtainable in a purer state and in a much shorter time than is the case in previous processes.

According to our invention peri acid and a primary arylamine are heated with water in an autoclave until condensation is completed, preferably at a temperature between 140 and 180° C. An excess of the primary arylamine is used, the preferred proportions in the case of aniline being 2 parts of peri acid and about 1 part of water to about 6 parts of aniline. The aryl-peri acid formed is then isolated by distilling off the aniline, treating the residue with an alkali to form the corresponding sulphonate, purifying the sulphonate, and acidifying to produce the aryl-peri acid.

Our new process may be illustrated by the following specific example:

100 parts of peri acid (1-aminonaphthalene-8-sulphonic acid) purity of 90 to 95%, are added with rapid agitation to 300 parts of aniline and 50 parts of water in an autoclave. The autoclave is then closed and the temperature is raised to about 170° and held at this point for about five hours. The mass is then distilled with vacuum to remove as much as possible of the excess and uncombined aniline, treated with alkali (for example, sodium hydroxide) to form the solution of the salt of phenyl peri acid, and the remainder of the mass steam distilled to remove the last traces of aniline.

The charge is then diluted and filtered hot to remove any solid material. From this solution phenyl-peri acid may be precipitated by acidifying with a stronger acid such as sulphuric acid. The solution of phenyl-peri acid thus obtained is of a degree of purity higher than that obtained by any other known process. It has been found not only to be freer from impurities but also to give dyes of better shade than phenyl peri acid manufactured by any other known method.

We wish it to be understood that we are not confined to the exact procedure outlined above, for the reason that it is sometimes advisable to carry on the heating for a longer period of time than five hours and at a lower temperature than 170°, the reaction being hastened at the higher temperature. The reaction will proceed at 100° C. but at a lower rate, so that it is desirable to carry on the reaction at a temperature substantially above 100° C.

The process may be employed for the manufacture of derivatives similar to phenyl-peri acid; for example, tolyl-peri acid, in which case toluidine is substituted for aniline and the remainder of the process carried out in a manner similar to that above described. Xylidines, naphthylamines, and other primary amines may be employed in the place of aniline to produce corresponding derivatives of peri acid.

We claim:—

1. A process of producing an aryl-peri acid which comprises heating peri acid and a primary arylamine under pressure in the presence of water.

2. A process of producing an aryl-peri acid which comprises heating peri acid and a primary arylamine under pressure at a temperature of from about 140 to 180° C. in the presence of water.

3. A process of producing an aryl-peri acid which comprises heating peri acid and a primary arylamine under pressure for about five hours at a temperature of about 170° C. in the presence of water.

4. A process of producing an aryl-peri acid which comprises heating under pressure at a temperature between about 100° C. and 200° C. two parts of peri acid and about one part of water with an excess of a primary arylamine.

5. A process of producing an aryl-peri acid which comprises heating under pressure two parts of peri acid and about one part of water with an excess of aniline at a temperature above 100° C. and below that at which thermal decomposition of the resulting aryl-peri acid occurs.

6. A process of producing phenyl-peri acid which comprises heating peri acid with aniline under pressure in the presence of an amount of water which is less than the amount of peri acid used.

7. A process of producing phenyl-peri acid which comprises heating peri acid with aniline under pressure at a temperature of from about 140 to 180° C. in the presence of an amount of water equal to from 30 to 60% of the quantity of peri acid used.

8. A process of producing phenyl-peri acid which comprises heating peri acid with aniline under pressure for about 5 hours at a temperature of about 170° C. in the presence of water.

9. A process of producing phenyl-peri acid which comprises heating 2 parts of peri acid and about 1 part of water with about 6 parts of aniline in an autoclave at a temperature between 160 and 180° C. until the reaction is completed.

10. A process of producing phenyl-peri acid which comprises heating 2 parts of peri acid and about 1 part of water with about 6 parts of analine in an autoclave at a temperature between 160 and 180° C. until the reaction is completed, subjecting the mass to distillation in vacuo to remove excess aniline, treating the residue with an alkali to form the salt of phenyl-peri acid, removing any remaining aniline by steam distillation, diluting and filtering the residue, and acidifying the filtrate to cause precipitation of free phenyl-peri acid.

In testimony whereof we affix our signatures.

HARRY D. GIBBS.
EDWIN L. FREDERICK.